(12) United States Patent
Mitchell

(10) Patent No.: US 9,479,250 B2
(45) Date of Patent: Oct. 25, 2016

(54) LIGHT BASED LOCATION SYSTEM

(71) Applicant: Comcast Cable Communications, LLC, Philadelphia, PA (US)

(72) Inventor: Slade Mitchell, Chester Springs, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 14/291,794

(22) Filed: May 30, 2014

(65) Prior Publication Data

US 2015/0349883 A1    Dec. 3, 2015

(51) Int. Cl.
*H04B 10/116* (2013.01)

(52) U.S. Cl.
CPC .................... *H04B 10/116* (2013.01)

(58) Field of Classification Search
CPC .................................................. H04B 10/116
USPC ........................................................ 235/440
See application file for complete search history.

(56) References Cited

U.S. PATENT DOCUMENTS

2013/0048707 A1* 2/2013 Do ...................... G01C 21/005
                                                              235/375
2014/0086590 A1* 3/2014 Ganick .................. G06Q 30/02
                                                              398/118
2014/0286644 A1* 9/2014 Oshima .................. H04B 10/11
                                                              398/118

OTHER PUBLICATIONS

Philips Ethernet-Powered Lighting Transmits Data to Mobile Devices, Slashdot, http://tech.slashdot.org/story/14/07/02/1810218/philips-ethernet-powered-lighting-transmits-data-to-mobile-devices-via-light, 6 pages, retrieved Oct. 27, 2014.
Lee Bell, "Philips shows off Ethernet-powered LED connected lighting for offices of the future," http://www.theinquirer.net/inquirer/news/2353102/philips-shows-off-ethernet-powered-led-connected-lighting-for-offices-of-the-future, dated Jul. 1, 2014, 5 pages.

* cited by examiner

*Primary Examiner* — Toan Ly
(74) *Attorney, Agent, or Firm* — Banner & Witcoff, Ltd.

(57) ABSTRACT

Aspects of the disclosure relate to a light source based location and operation system. A computing device may detect an encoded light signal containing an identifier from a light source at a location. The encoded light signal can be decoded to obtain the identifier, and a request for information based on the identifier can be transmitted in response to decoding the identifier. Information associated with the identifier may be received in response to the request for information including location information corresponding to the location of the light source. The location information may be used to provide additional information to the user or enable a user to control devices based on the location information.

20 Claims, 8 Drawing Sheets

LIGHT BASED LOCATION SYSTEM

BACKGROUND

The ability for a device to determine its own location is becoming useful in providing the user of the device with location based content. Some devices may use a global positioning system (GPS) signal to determine its location, but such signals may not be available indoors. Computing devices can determine their location using a variety of signals such as cellular tower signals and GPS signals. Sometimes signals from external sources such as cellular towers and GPS satellites are unavailable due to a variety of reasons such as interference, weather, buildings, and insufficient signal coverage. Therefore, there remains a need to determine a location of a device when certain radio signals are not available.

SUMMARY

The following summary is for illustrative purposes only, and is not intended to limit or constrain the detailed description.

Some features herein relate to obtaining information based on an identifier emitted by a light source. The identifier may be emitted by the light source using light pulses modulated according to an encoding scheme. The light source may be programmed or pre-programmed with an identifier to be emitted by the light source. To program the light source to emit an identifier, a computing device may generate an identifier and transmit the identifier to the light source, and the light source may store the received identifier for emission in an encoded light signal.

In some embodiments, a user may use a computing device to capture and decode the identifier being emitted by a light source. The computing device may transmit a request for information based on the identifier to a registry server to obtain information associated with the identifier. For example, the information associated with the identifier may be location information of the location of the light source. The registry server may provide the computing device with the location information. Using the information provided by the registry server, the computing device can determine based on, for example, account information of the user which devices in the same location or nearby may be controllable. The location information associated with the location of the light source may be used to enable a user to control a device in the same location or within the vicinity of the light source.

In some aspects, the light source may be a light source which can emit an identifier or may be a light source with an adapter which can control the light source to emit the identifier in an encoded light signal. The light source may be a light source which can be controlled to emit the encoded identifier in a manner that is invisible to the human vision system. For example, the identifier may be transmitted using light outside of the visible spectrum. The identifier may be transmitted using light pulses at a frequency that is undetectable to the human eye.

In another aspect, the light sources emitting identifiers may be strategically placed to enable a user to navigate a space using the identifiers emitted by the light sources.

The summary provides some examples and is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
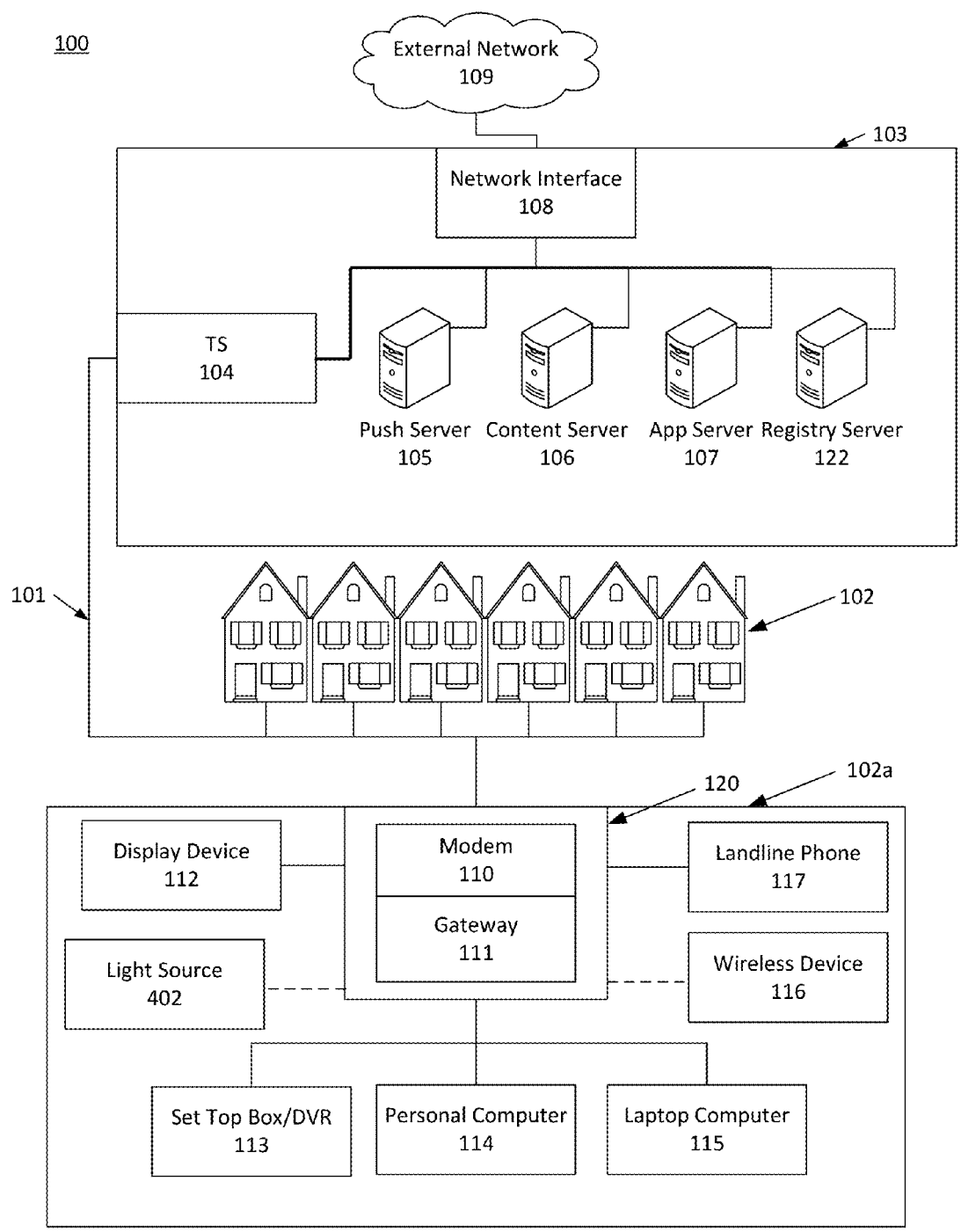
FIG. 1 illustrates an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107, 122 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Another application server can record and store relationships account information including identifying information of devices (e.g., serial number, MAC address, etc.) activated on a user's account. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

Another server may be a location server or registry server 122. The location server 122 can contain registries or databases of identifiers and associated data (e.g., location information, device information, user information and/or other information) for each identifier. The registries can be public or private registries. Public registries may be accessed by any user. Private registries may be access controlled using security measures, for example, a user name and password and/or encryption. The location server 122 can provide a user interface to enable a user to setup the user's registry of identifiers and user inputted information for each identifier.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others. The premises 102a may further include a light source 402 which may include a communication interface that can communicate using a wired medium or wirelessly with the modem 110 and/or gateway 111 and other devices in the premises 102a such as the display device 112, set top box/DVR 113, personal computer 114, laptop computer 115, and wireless device 116.

Figure 2:
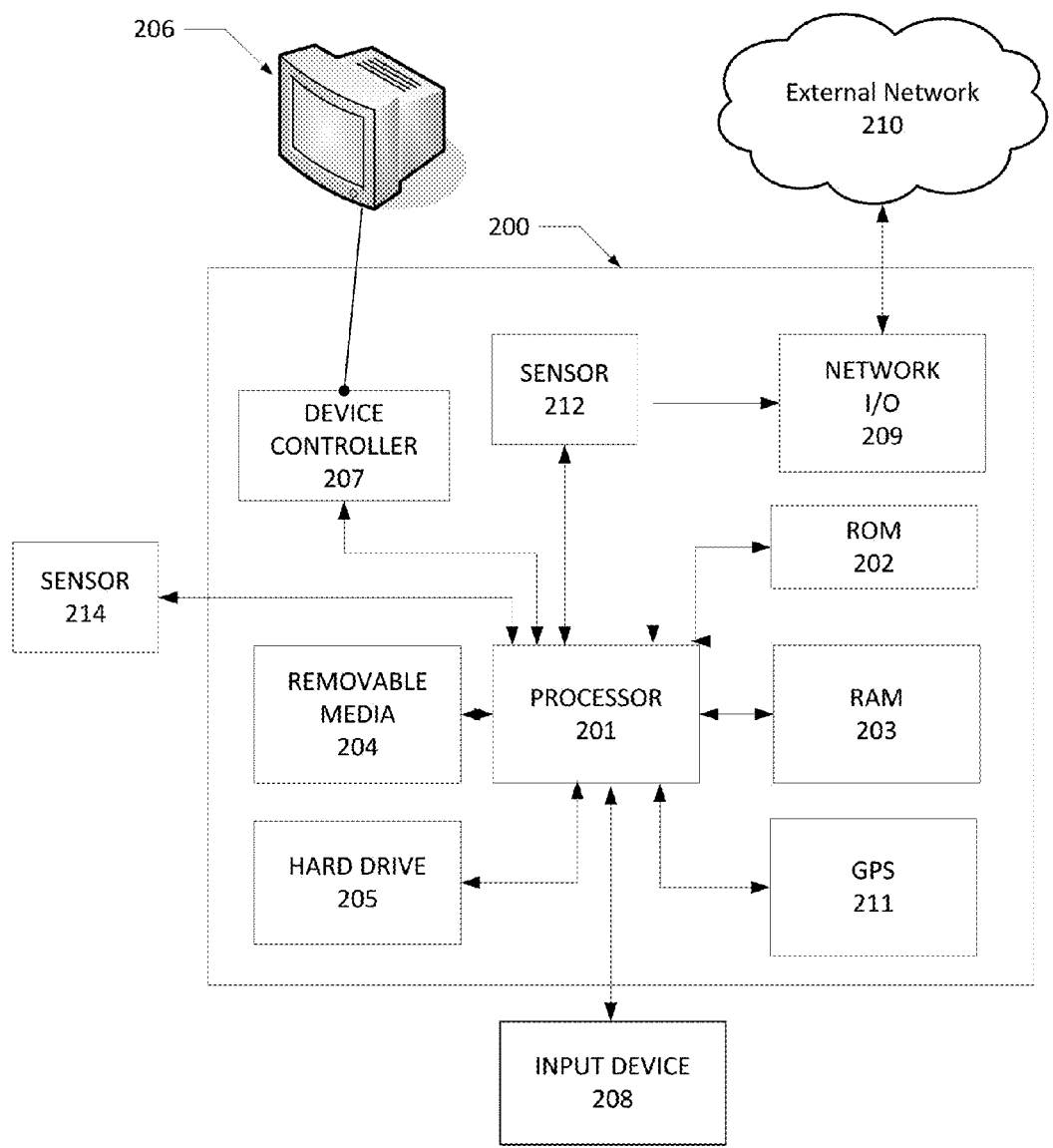
FIG. 2 illustrates an example computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. The device may include a location-detecting device, such as a global positioning system (GPS) microprocessor 211, which can be configured to receive and process global positioning signals and determine, with possible assistance from an external server and antenna, a geographic position of the device. Additionally, the device may include internal and/or external sensors such as sensors 212, 214. Sensors 212, 214 may be capable of detecting and capturing light having a wavelength in the visible and invisible spectrums. Sensor 214 may be connected to or communicate with the device via an interface of the device. The interface of the device may be located between the external sensor 214 and the device may be a wired or wireless interface (e.g., USB, Ethernet, Wi-Fi, Bluetooth, or Zigbee).

FIG. 2 shows an example of a computing device. The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

Aspects of the disclosure described herein relate to enabling a device to determine its location when external signals are unavailable such as using a localized positioning signal. A localized location determination of the device can be used in a variety of ways including providing navigation and location information as positioning changes, providing customized content, and controlling other devices within a proximity of the device.

Figure 3:
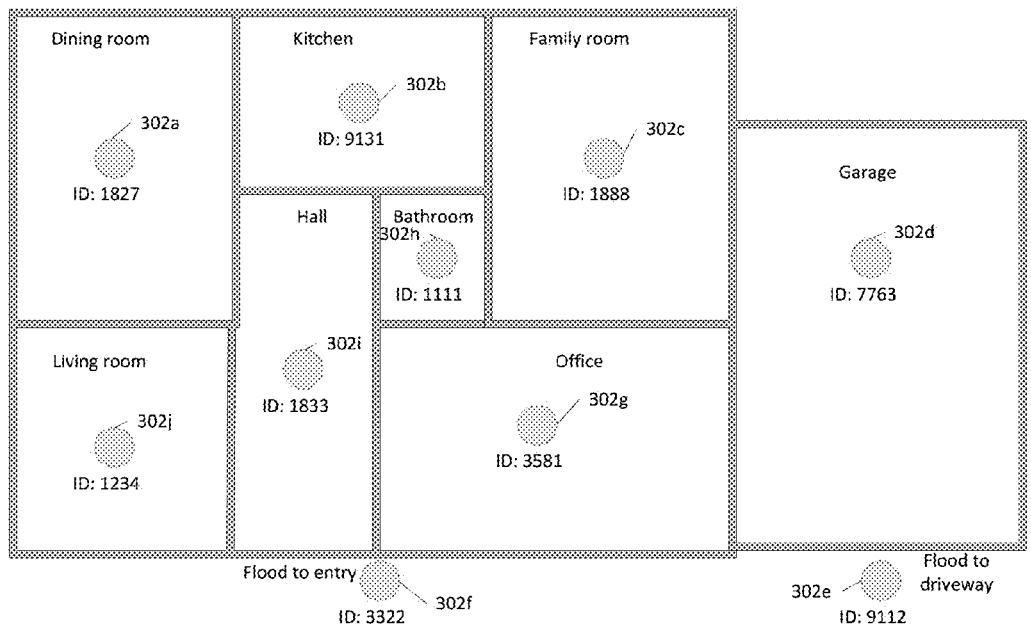
FIG. 3 illustrates an example premises including light sources according to various aspects of the disclosure.

FIG. 3 illustrates a premises 300 which may be a house containing local positioning signal sources 302. The premises 300 may include the devices illustrated and described for premises 102a. The local positioning signal sources 302 may be placed in locations throughout the house. The positioning signal sources 302 may be any suitable radiation such as optical radiation (i.e., light) sources 302a-302j which can emit an identifier at different wavelengths (e.g., within or outside of the visible spectrum) that can be used to determine information such as location information based on the location of the signal source 302. The light sources may be light bulbs (including LEDs) and any similar device that can generate light in a visible and/or invisible spectrum. The light sources may further be incorporated into other devices such as display devices or used with an adapter that controls the light source to modulate signals. For example, the light sources may also include LEDs associated with consumer electronic devices such as televisions.

In the example shown in FIG. 3, the light sources 302a-302j may be light bulbs placed in lighting fixtures in the house. For example, light bulbs 302 can be placed in light fixtures (e.g., ceiling lights, floor lamps) in each room as well as in light fixtures outside of the house. The light bulb 302 emission can be modulated to produce an encoded signal in the form of light pulses or flickering. A light pulse may be generated by having the light source emit light for a period of time and followed by the absence of light emission. Light pulses for emitting data can also be generated using different light intensities. The light emitted from the bulb can be encoded to emit an identifier or a signature. For example, a sensor on a computing device can detect the encoded light signal, and the computing device can decode an identifier from the light signal. During a registration process which will be described in more detail with respect to FIG. 6, information associated with the light bulb and the identifier can be stored in a database or registry in a server. Once the identifier in a room has been determined, the device can query the registry to obtain information stored for the identifier. For example, during the registration process, a user can register the identifier of a particular bulb with a location in the house. For bulb 302c which emits identifier "1888" and is shown as being located in the family room, the user may register the identifier "1888" as being associated with the family room of the house. Similar association information between locations of the house and identifiers of bulbs in these locations can be stored during the registration process which will be described with respect to FIG. 5.

According to another aspect, the information stored for the detected identifier can include a device identifier (e.g., serial number, MAC address, IP address) associated with the location of the bulb (e.g., in the same room). When the user is using a computing device in the family room, the computing device can detect the identifier "1888" from the bulb 302c and determine that the user is located in the family room by obtaining information associated with the identifier "1888." The user's family room may contain a television or display device and a terminal device (e.g., modem, gateway, set top box, digital video recorder) connected to the television or display device which can enable the television or display device to display video programming content. An identifier of a terminal device or television or display device in the same room as the light source may be stored for identifier "1888." In determining that the user is located in the same room as a television, the computing device may enable the user to control the content on the television, for example, through the terminal device using the computing device. Information about the particular television that the user is watching can be used to determine what content the user is watching, and the user can be provided with information based on the current content being displayed. For example, the system can determine at what point in a program a user is watching and provide additional content such as extra or bonus content including links to websites, advertisements, or interactive features which are relevant to the particular program that the user is watching. The additional content can be relevant to the particular portion of the program that the user is watching. For example, if the user is watching an advertisement, a link to or other information about the product or service website may be provided. As another example, if the user is watching a television program, commentary about the portion of the program that the user is watching or a deleted scene may be provided.

The user's kitchen may also have a television such that when the user enters the kitchen and receives a signal from bulb 302b including the identifier "9131," the device can determine that the user is in the kitchen and enable the user to control the television in the kitchen. The localized light based location system can advantageously provide the user with customized location information and localized location information as well as enable the user to use the localized location information for a variety of purposes including controlling devices and receiving content on a computing device using the detected identifier in response to the identification of the user's location.

Figures 4A, 4B:
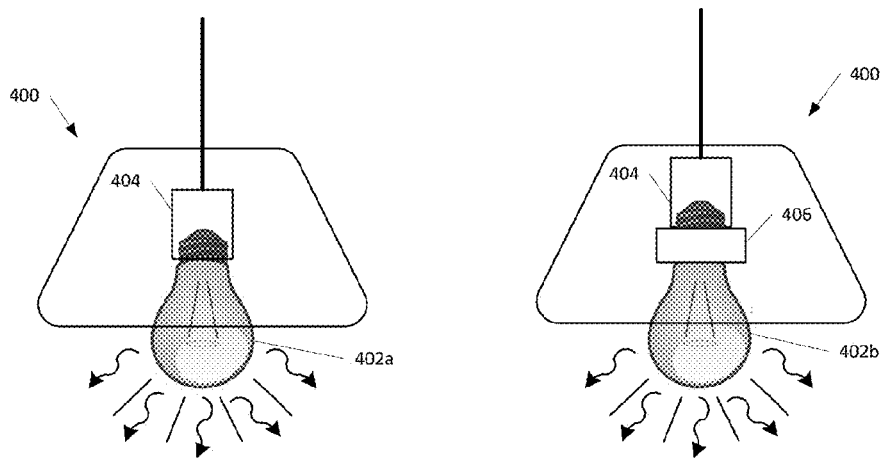
FIG. 4A shows an example of a light source according to some aspects of the disclosure.
FIG. 4B shows an example of a light source adapter according to some aspects of the disclosure.
Figure 5A:
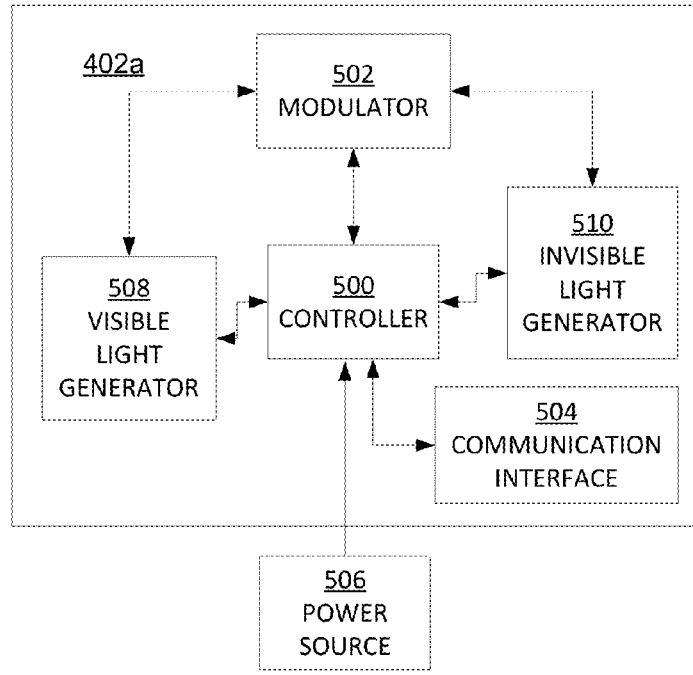
FIG. 5A illustrates a schematic example of the light source of FIG. 4A.

FIG. 4A illustrates an example of a light source 402a with an integrated controller and modulator for controlling the light emitted from the light source 402a. The light source 402 may be any type of light emitter which can be controlled to emit light pulses. For example, the light source 402 can be a light bulb including an incandescent light bulb, fluorescent light bulb including compact fluorescent light (CFL) bulb, light emitting diode (LED), halogen lamp, and metal halide bulb or any combination thereof. FIG. 5A shows the light source 402a in more detail. With the light source 402a, the user can install the light source by, for example, screwing in the light source without any special tools or instructions. The light source may be pre-programmed, for example, by the manufacturer such that the light source is ready to begin emitting an identifier once installed.

Figure 5B:
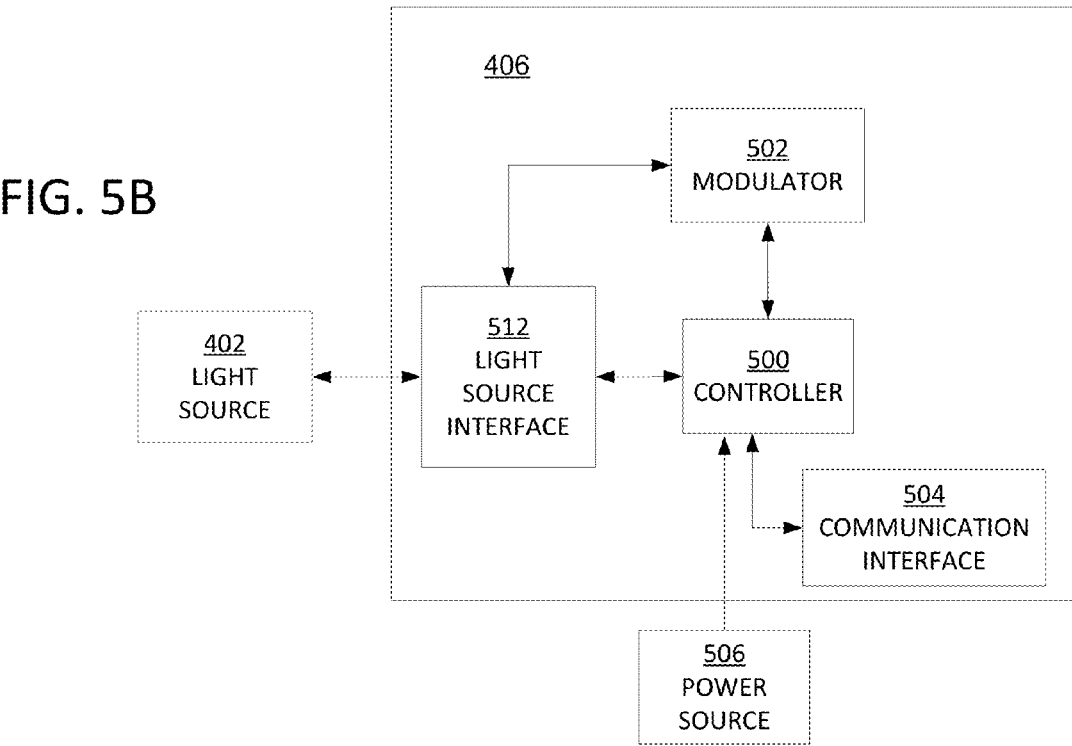
FIG. 5B illustrates a schematic example of the light source adapter of FIG. 4B

FIG. 4B illustrates an example of a light source 402b used with an adapter 406 to control the light source 402b. FIG. 5B shows the adapter 406 in more detail. Using the adapter 406, the user can easily convert an existing light source into a light source emitting an identifier. The system described herein using a light source emitting an encoded light signal is advantageous since special equipment is not needed to setup the location detection system. The user need only install a light source 402 or adapter 406 in appropriate locations.

FIG. 5A illustrates a schematic diagram of an example of light source 402a including a controller 500, a modulator 502, a communication interface 504, a power source 506, a visible light generator 508, and an invisible light generator 510. The light source 402a may include a controller 500 that can control the visible light generator 508 and/or the invisible light generator 510 to emit encoded signals by modulating the generators 510 to emit light pulses forming an encoded signal. The controller may be variously configured to include one or more processors, a GPS unit, software such as triangulation software, and/or may be integrated into, coupled to, and/or comprise computing devices 200. The controller may provide control and data signals to the modulator 502, communication interface 504, and light generators 508, 510. The modulator may be a pulse modulator which controls the light generators 508 and/or 510 to emit light pulses according to a modulation scheme by enabling and disabling light emission. The modulator may receive identifier data from the controller and convert the data into light pulses according to a modulation scheme to produce an encoded light signal. The modulator may output a signal that controls the light intensity to produce light pulses. For example, the modulator can regulate the amount of power provided to the light generator. The light source may emit the identifier in encrypted form. For example, the controller may encrypt the identifier and pass the encrypted identifier data to the modulator. Emitting the identifier data in encrypted form can be used as a security measure, for example, for privacy or to prevent spoofing of the identifier by an unauthorized light source.

The encoded light signal may be emitted in a manner that is undetectable or invisible to the unaided human eye. For example, the frequency of the light pulses may be above a detectable threshold. The detectable threshold for a human vision system may be a frequency above 50 Hz. Another manner of emitting light pulses without disturbing the user may be to emit the light signal at a spectrum outside of the visible range. The visible light generator 508 may be a light generating portion of a typical light bulb such as an incandescent light bulb. The invisible light generator 510 may generate light in a wide range of spectrums including ultraviolet (UV), infrared (IR), and visible. The scheme used with the invisible light generator 510 emitting an encoded light signal in the infrared spectrum may be the Infrared Data Association (IrDA) standard. The power source 506 may be, for example, an outlet, battery, or solar panel. The communication interface 504 can be a wired or wireless interface to enable external devices to send information to the light source. The communication interface 504 can, for example, be used to program the light source. The communication interface 504 can be a wireless communication interface including Wi-Fi (e.g., IEEE 802.11, IEEE 802.15), Bluetooth, and infrared or a wired interface such as a universal serial bus (USB) interface.

The light source 402 may be incorporated into other devices including display devices. For example, the light source 402 may include all or part of the backlight of a display device. The display device can control the light intensity and modulation of the backlight. For example, a controller of the display device can control the light intensity and a modulator of the backlight can control the backlight to produce light pulses or flickering of the backlight. The backlight may be modulated at a frequency higher than a frequency detectable by the human vision system or configured to emit light at a wavelength outside of the visible range.

Since light outside of the visible range is undetectable by the unaided eye, the identifier may be continuously emitted using light in the invisible range. In another aspect, the light source 402 and the display device may have a special mode in which the identifier is emitted using visible or invisible light for a short period of time sufficiently long for the sensor to detect and capture the encoded light signal (e.g., 5 seconds).

FIG. 5B shows a schematic diagram of an example of the adapter 406. The adapter 406 may include a controller 500, modulator 502, communication interface 504, power source 506, and a light source interface 512. The controller 500, modulator 502, communication interface 504, and power source 506 may be similar to those described with respect to FIG. 5A. The light interface 512 can be a light socket which enables the transmission of power to the light source 402. The controller 500 and modulator 502 can control the emission of light pulses by the light source 402 through the light source interface 502. The light source interface 502 may be a standard lampholder socket for various types of lighting sources. For example, if the light source 402 is an incandescent light bulb, the light source interface 512 may be an Edison screw base.

According to an aspect shown in FIG. 4B, the adapter 406 may be placed between the power source 506 and the light source 402 such that the adapter 406 controls the light pulses by controlling power to the light source 402. The adapter 406 is inserted into the socket 404 of a light fixture 400. The adapter can control the light source to emit light pulses, for example, by modulating the power passed to the light source 402. If the adapter is to be used with, for example, an incandescent light bulb as the light source 402, the adapter may also have an Edison screw type interface to connect to a power source 506 using a light bulb socket. The adapter 406 can control the light source to emit pulses at a frequency undetectable by the human eye.

The light pulses of the light source 402 may be emitted using light in the visible spectrum and/or the invisible spectrum. The visible light generator and the invisible light generator may be independently controlled. For example, the light pulses may be emitted using light having a wavelength in the ultraviolet (UV) and/or infrared (IR) range while the light source can continue to function as a light source, that is, providing continuous light in the visible range. Thus, the light pulses are undetectable or invisible to the unaided eye, and the light source can continue to provide visible light. The sensor on the computing device can detect light within any of these ranges and filter for light in a specific range to determine if light being emitted in a particular spectrum includes an encoded identifier. Multiple identifiers can be emitted from the light source by emitting light pulses in different frequency ranges. For example, one identifier may be emitted in the infrared range while a second identifier may be emitted in the ultraviolet range. In another example, the first identifier may be emitted in a first infrared wavelength range and a second identifier may be emitted in a different infrared wavelength range. The ranges may or may not overlap. In yet another example, an identifier may be emitted using the visible light generator at a frequency above the threshold of flickering detectable by the human eye and another identifier may be simultaneously emitted using the invisible light generator.

Figure 6:
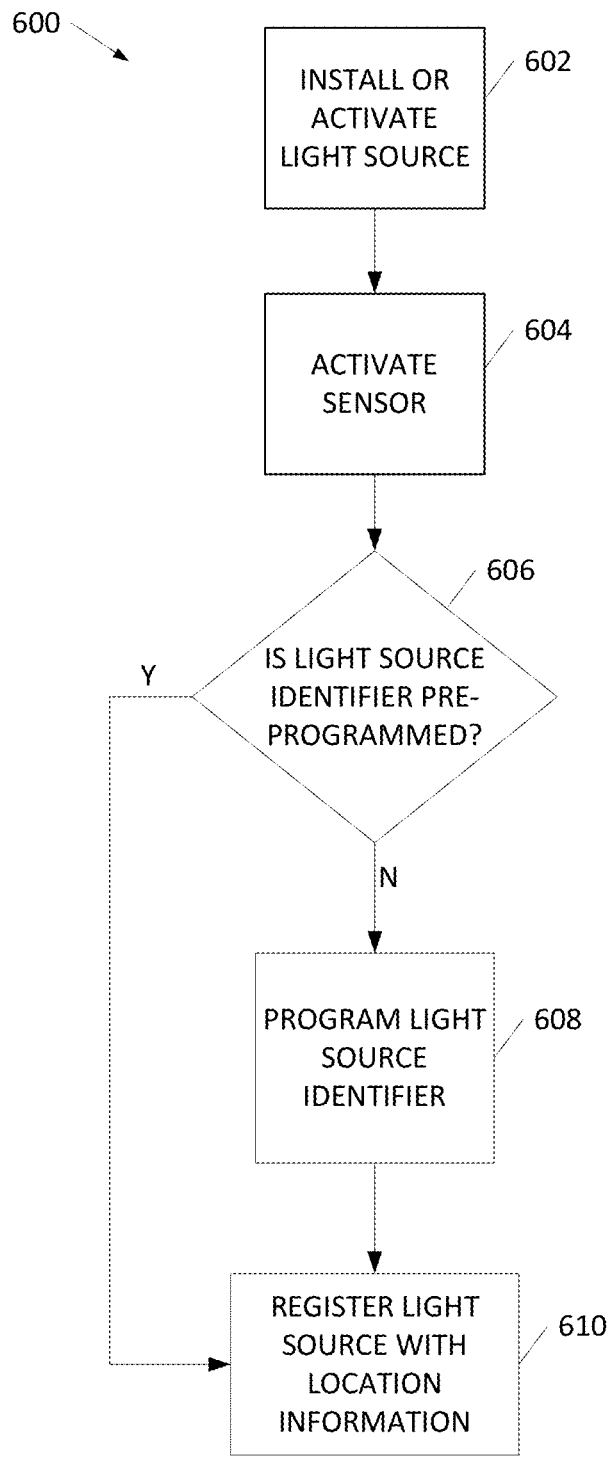
FIG. 6 shows an illustrative method for registering a light source identifier.

FIG. 6 illustrates an exemplary flowchart of a method of registering the light source 600. At step 602, the user can install or otherwise activate the light source, for example, by connecting the light source to a power source. For example, the user can place the light source in a light socket or attach the adapter between a light source and a power source. At step 604, the user may activate an application on the user's computing device to activate the sensor to detect for the encoded light signal.

At step 606, the application may determine whether the light source has been pre-programmed with an identifier. A light source having a pre-programmed identifier may have a plug and play capability such that the light source may be enabled to immediately begin emitting the identifier once connected to a power source and turned on. For example, the application may cause the sensor of the device to detect for an encoded signal from the light source. The sensor can pass the captured light to the processor which can filter for light in different frequency ranges. From the filtered light, the processor can analyze the light intensity for a modulated light signal or a sequence or pattern of light pulses. If the light source is already emitting an encoded signal, the device can capture the encoded signal through the sensor, and the device can decode the signal to obtain a pre-programmed identifier. If the light source is not pre-programmed with an identifier, then the device may not detect an identifier in the emitted light or an encoded signal. In response to the absence of an identifier, the device may generate an identifier and cause the light source to be programmed with an identifier at step 608. For example, the device can generate a unique identifier. In another example, the device can detect for identifiers being transmitted from other light sources in the area and generate an identifier based on other identifiers in the area which may be the same or different from other identifiers in the area. According to another aspect, the device may transmit an identifier request to the server for the registry, and the registry server 122 can generate the identifier to be associated with the light source. The registry server 122 may generate the identifier to be the same or different than other identifiers stored in the database in the server. The identifier emitted by the light source may be any combination of characters (e.g., alphanumeric) and/or symbols which can be decoded by the device.

At step 608, the device may send a signal to the light source with an identifier that the light source is to emit. For example, the computing device may send a programming message including the identifier that is received by the communication interface 504 of the light source 402 and the light source 402 can store the received identifier in a memory. The computing device (e.g., personal computer 114, laptop computer 115, wireless device 116) may communicate with the light source 402 through the modem 110 and/or gateway 111.

If the device determines that the light source has been pre-programmed (e.g., by the manufacturer) with an identifier at step 606 or the device has programmed the light source with an identifier at step 608, the device can proceed to step 610 and register the location information associated with the identifier in a location registry which may be a database or other storage in a memory of a device such as a server by transmitting the identifier and location information over a network to the registry.

In some aspects, the light source may be integrated into the computing device (e.g., television system, gaming console) and the computing device may be able to self-register with the registry server. For example, the light source of the computing device may emit an encoded signal which can be detected by the sensor of the computing device. The computing device can decode the detected signal to obtain the identifier and register with the registry server as described herein.

A public or private registry may be used. For example, for a user's home, the user may select to set up a private registry to which the user can restrict access, for example, using a password or other access controlling means. The location registry may be stored in the form of a table as shown in Table 1 below. In Table 1, for each identifier in the table, a location or locations and/or other information may be listed for the identifier. Where encoded light sources are installed in a public space, such as a train station, a public registry may be used.

TABLE 1

| Identifier Registry | |
|---|---|
| ID | Context |
| 1827 | private:dining room |
| 1234 | private:living room; private: gateway (MAC: 01:23:45:67:89:01 |
| ... | |
| 9112 | private:driveway |

Different public registries may be associated with different accounts, and the identifiers may be generated and assigned to be unique for particular sets of information. For a global registry, a universally unique identification (UUID) may be used.

Figure 7:
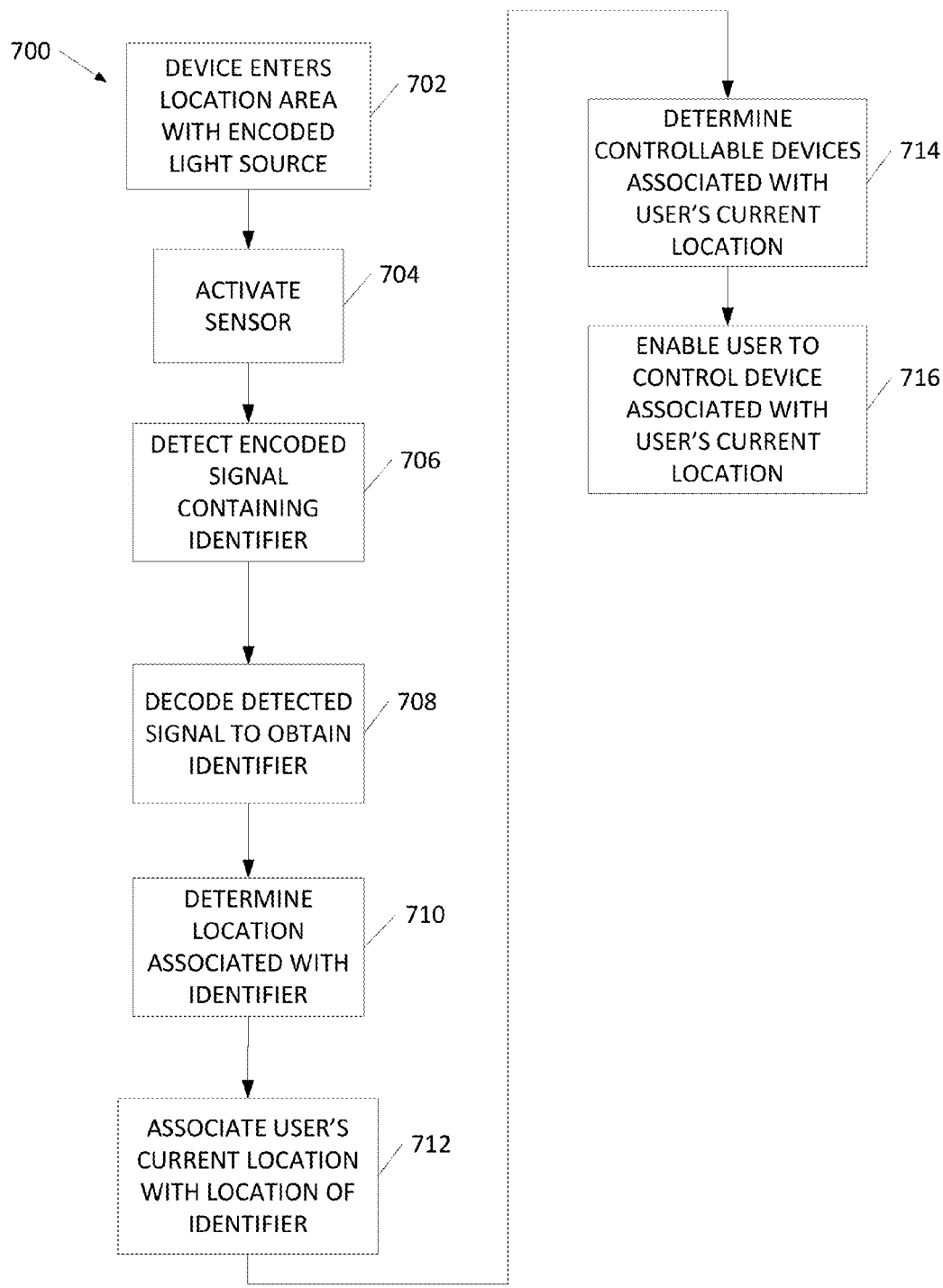
FIG. 7 shows an illustrative method for light based location determination and information retrieval.

After registering the identifier and associated location information in the registry, a user may use the light source 402 to automatically determine location or retrieve proximity related information for example according to an aspect illustrated in and described with respect to FIG. 7.

FIG. 7 shows a flowchart of an example of a method of light based location determination and information retrieval. At step 702, the computing device (e.g., personal computer 114, laptop computer 115, wireless device 116) may enter or be within an area in which the device can receive a light signal. The light signal may be transmitted within a frequency range that is detectable and can be captured by a sensor (e.g., camera, infrared sensor). The light signal may be encoded. The emitted light intensity can be used to both provide light pulses and control the range at which the light pulses emanating from a particular light source can be detected.

At step 704, the computing device may activate a sensor. The sensor of the computing device may be activated in response to a variety of stimuli including user commands, commands from an application, or detection or sensing of a light source by, for example, the computing device. The sensor can also run in the background to continuously or automatically determine the location of the computing device being used by the user. At step 706, the computing device may detect an encoded light signal containing an identifier from a light source 402. The sensor can capture light intensity with respect to different frequencies. At step 708, the computing device may decode the encoded signal to obtain an identifier that is transmitted from the light source 402 by analyzing light intensities at particular frequencies or ranges of frequencies. Using the identifier transmitted from the light source, the device may communicate with a registry server 122 to obtain location information at step 710. For example, the computing device may transmit an information request including the decoded identifier, and the registry server may transmit a response to the computing device including information in the registry associated with the identifier (e.g., location information, controllable device information).

At step 712, the computing device or the registry server may associate the user's current location, based on the computing device's location, with the location of the detected identifier. At step 714, the computing device may transmit a request to identify controllable devices within the proximity or vicinity of the user's current location as determined based on the location information stored for the identifier. For example, the system can retrieve stored information of other devices known to be in the same location associated with the identifier. This can be determined by the user previously registering devices in the same location or by determining which other devices are detecting the same identifier. The identifier itself can be used to identify other devices in the same proximity.

At step 716, the computing device can enable the user to control devices identified within the proximity or vicinity of the user's current location. For example, the computing device may execute an application which can communicate with a terminal device to control content being displayed or presented on a display device. In the event there are multiple terminal devices, the computing device or the user may select one of the controllable devices to control. For example, the user may be using a remote control application which enables the user to control a terminal device (e.g., set-top box, cable box, television) using the computing device. The application may present the user with names for each of the terminal devices, and the user may select one of the terminal devices to control in the application. According to another aspect, the computing device may automatically select a default terminal device or a most frequently used terminal device based on past usage history (e.g., most viewing time). A communication channel may be established between the computing device and the selected terminal via a server (e.g., app server 107) based on the selection.

Figure 8:
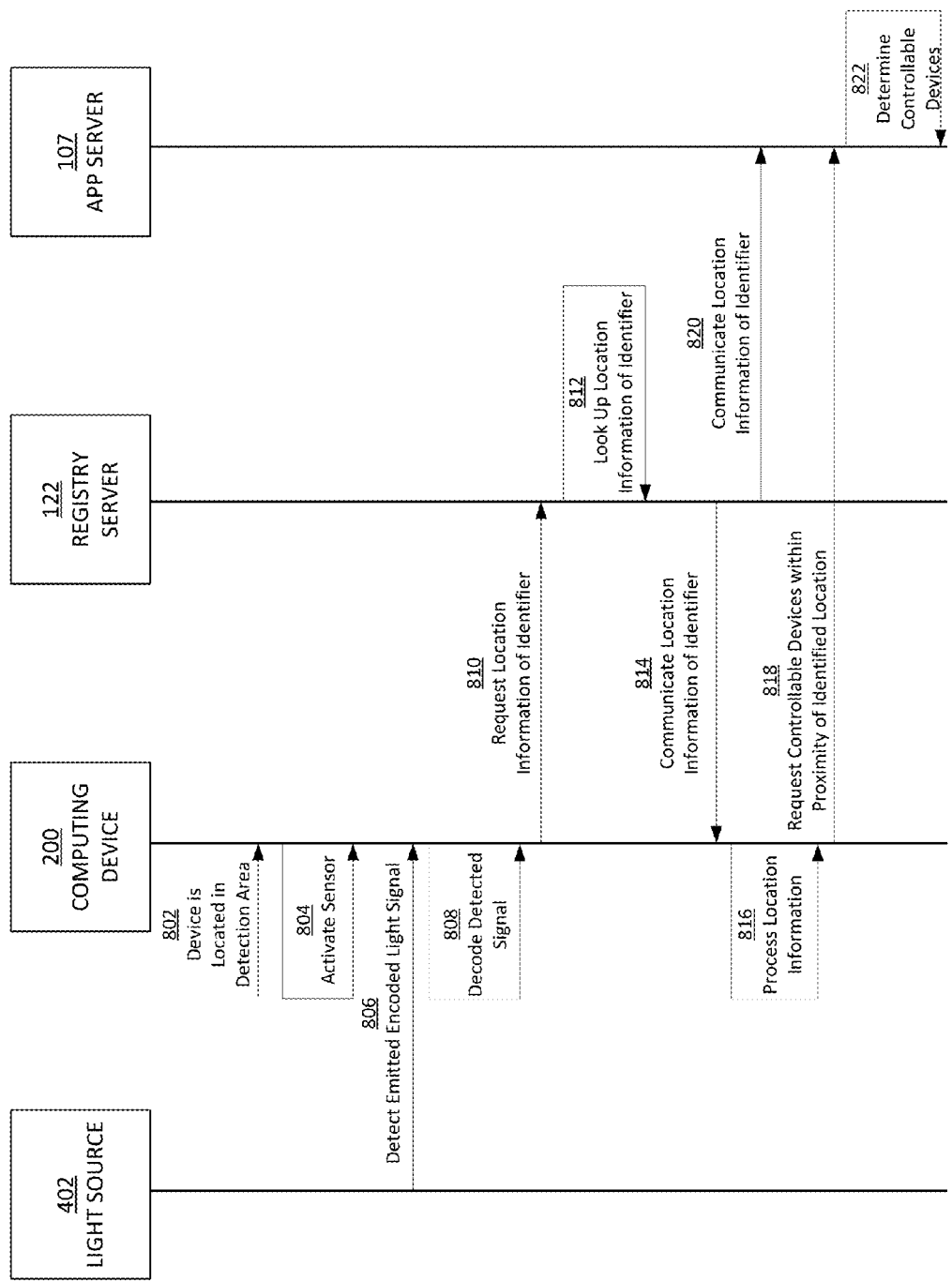
FIG. 8 shows an illustrative process flow diagram of various signals and communications between devices in the system according to some aspects of this disclosure.

FIG. 8 shows an illustrative process flow diagram of various signals and communications between devices in the system according to aspects of this disclosure. At 802, the computing device (e.g., personal computer 114, laptop computer 115, wireless device 116) may enter or be located within an area where light from a light source 402 is detectable. At 804, the sensor of a computing device can be activated to detect for encoded light emitted from the light source at 806. At 808, the computing device can decode the encoded light to obtain an identifier of the light source 402. At 810, the computing device can include the identifier in a request for information associated with the identifier stored in the registry that is transmitted to the registry server 122. The registry can perform a search of registry information using the identifier received from the computing device at 812. At 814, the registry server 122 can return the location information for the received identifier. For example, if the registry server 122 received the identifier "1234" from the computing device in 810, the registry server 122 can use a table associated with the user or a selected registry (e.g., Table 1) to transmit the location information as the "living room" to the computing device and store information of the requesting device (e.g., a serial number, IP address, MAC address) in 814. Upon receiving the location information, the computing device can process the location information and perform various actions based on the received location information. For example, the location information may indicate or identify a terminal device such as a gateway 111 or modem 110 associated with the user's account and may also indicate which devices recently requested information associated with the same identifier. The terminal device can control content displayed on a display device such as a television.

According to another aspect, the computing device can use the location information to request controllable devices within proximity of the identified location from a server in the network such as an app server 107. For example, the computing device can request information about controllable devices in the same location as the computing device or in the same premises as the computing device based on the location information associated with the identifier by sending a request to a server (e.g., app server). The app server may have account information of the user or may be able to access another server storing user account information. Using the identifier and/or information associated with the identifier that is provided by the registry, the app server 107 can determine which devices may be controlled or within the vicinity of the user. If there is only one device within proximity of the identified location, the app server 107 can automatically establish a communication channel from the computing device to the terminal device to enable the computing device to send control signals to the terminal. For example, an application on the computing device may communicate with the terminal device via a server in the network such as app server 107. In another aspect, the registry server can communicate the location information of the identifier with information about the requesting computing device, and the app server 107 can enable communication between the computing device and the terminal on the back end (i.e., without further involvement from the computing device). For multiple devices within the proximity of the identified location, the computing device or the user may select one of the devices to control, and transmit the selection to the app server 107. The selection may be transmitted in a connection request including the identifier of the selected device, and in response to receiving the connection request, the app server 107 can establish a communication or control channel between the computing device and the selected terminal device.

Figure 9:
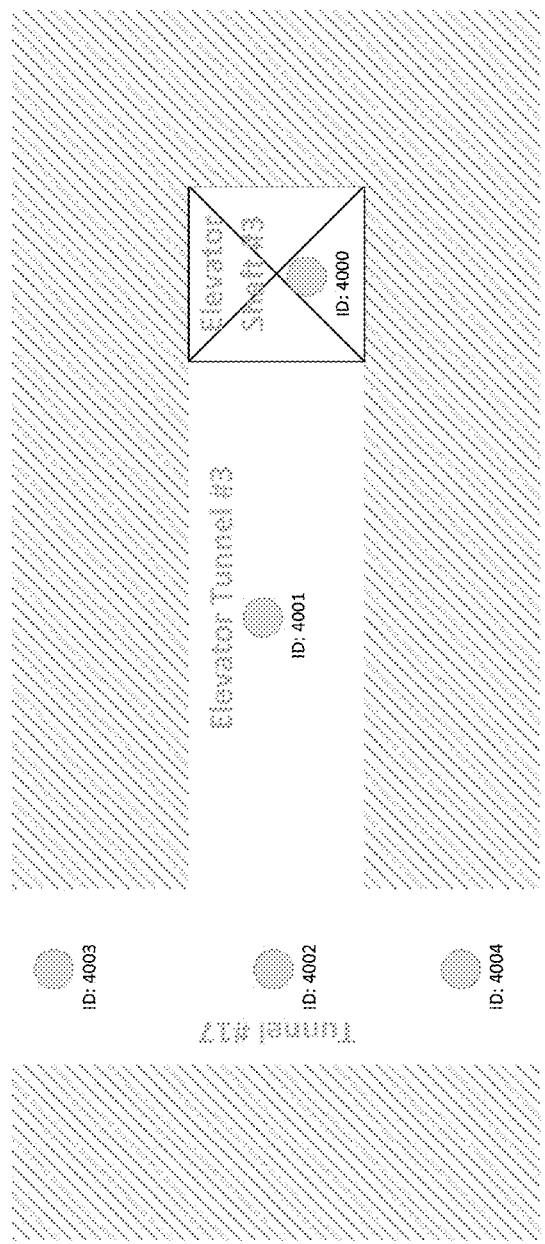
FIG. 9 shows an example of a scenario where localized location determination may be used according to some aspects of the disclosure.

FIG. 9 shows another example where a localized location determination may be used according to some aspects of the disclosure. In underground environments or other indoor environments, it may not be possible to receive radio signals from antenna towers or satellites or it may be possible to receive only weak signals on which to base a location determination resulting in the inability to determine a location using the computing device or resulting in inaccuracy or impreciseness in the location determination. For example, the light sources described herein may be placed in distributed locations along an underground tunnel or a hallway within a building to identify the user's location and thereby enable navigation. Each area may have a light source with different identifiers. The location information stored according to this aspect may contain three dimensions to identify different levels (heights or depths) in addition to a point on each level. The stored location information may be coordinates in the form of (x, y, z) or latitude, longitude, and elevation. By processing the detected the identifiers, the computing device can determine the user's location.

Table 2 is an example registry for the example shown in FIG. 9. Table 2 includes a column for the identifiers and a corresponding description of the location of each light source transmitting the identifier as well as coordinates of the location in three dimensions. The registry may be stored locally in a memory of the computing device, and the computing device can lookup information associated with the identifier instead of transmitting a request to a registry server using the locally stored registry.

TABLE 2

Registry

| | | |
|---|---|---|
| 4000 | Elevator in shaft #3 | 3D coordinates: x, y, z |
| 4001 | Midway down Elevator Tunnel #3 | 3D coordinates: x, y, z |
| 4002 | Intersection of Elevator Tunnel #3 and Tunnel #17 | 3D coordinates: x, y, z |
| 4003 | 100' North in Tunnel #17 | 3D coordinates: x, y, z |
| 4004 | 100' South in Tunnel #17 | 3D coordinates: x, y, z |

According to another aspect, the light sources may be used to both illuminate and provide location information for various outdoor locations such as a street tunnel. Similar to the example of FIG. 9, light sources may be distributed within the tunnel and with each light source associated with locational coordinates (e.g., latitude and longitude). For example, a computing device may have navigational capabilities as well as a sensor such as computing device 200. A device may rely on a GPS signal received by the device for location information, and when passing through a tunnel, the device may switch to using identifier information transmitted from the light sources to determine its location. The device may sense that an encoded light signal is available and switch to use the light signal for location information. The device may pre-store the location information in a memory before entering the tunnel.

Figure 10:
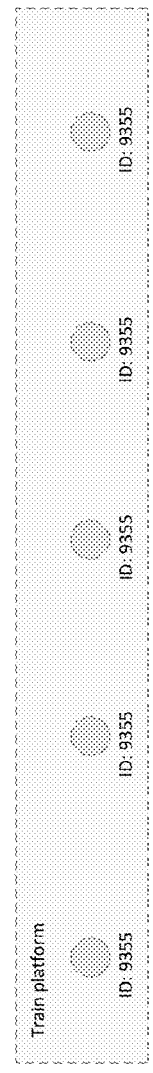
FIG. 10 shows another example of a scenario where localized location determination may be used according to some aspects of the disclosure.

FIG. 10 shows an example according to another aspect. FIG. 10 shows five light sources placed along a train platform. Each train platform may be assigned an identifier and the five light sources may be programmed to each transmit the same identifier. The area covered by a particular identifier can be extended beyond the light range of a single light source by using multiple light sources. The light sources may be placed adjacent to each other to provide a continuous zone where the same identifier may be detected. A user with a computing device on the platform may use the identifier to retrieve information specific to the particular train platform on which the user is standing. For example, using the identifier, the device may be able to retrieve train schedules for trains servicing this platform.

The light sources may also be used in other environments such as retail environments in which the location information may be used to provide relevant product information or advertisements. For example, store displays or advertisements may be illuminated with a light source 402 such that the user can be directed to a related link or additional information by being within vicinity of the display. The vicinity of the display may be an area around the display in which a computing device can receive an encoded light signal from the light source. The store display or advertisements may be presented on a display device with a backlight which may be controlled to emit an identifier according to some aspects of this disclosure. In response identifying a user's location as being in a particular location, the user may be provided with additional information associated with items in the user's location.

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

I claim:

1. A method comprising:
   detecting, by a computing device at a location, an encoded light signal from a light source at the location, wherein the encoded light signal indicates the location;
   transmitting, by the computing device, a request for a list of content consumption devices at the location indicated by the encoded light signal;
   receiving, by the computing device, the list of content consumption devices;
   transmitting, by the computing device, a selection of a content consumption device from the list of content consumption devices; and
   controlling, by the computing device, a selected content consumption device from the list of content consumption devices.

2. The method of claim 1, further comprising detecting, by the computing device at the location, the encoded light signal from a plurality of light sources at the location.

3. The method of claim 2, wherein the detecting, by the computing device at the location, the encoded light signal from the plurality of light sources at the location comprises detecting the encoded light signal from one or more display devices.

4. The method of claim 3, wherein the detecting the encoded light signal from the plurality of light sources comprises detecting the encoded light signal from at least part of a backlight of the one or more display devices.

5. The method of claim 1, further comprising:
   decoding the encoded light signal to obtain an identifier associated with the light source at the location; and
   registering the identifier in a database, wherein the database comprises information associated with the light source.

6. The method of claim 1, wherein the controlling, by the computing device, the selected content consumption device is in response to:
   transmitting, by the computing device and to a second computing device remote from the computing device, a connection request to establish a communication channel between the computing device and the selected content consumption device.

7. The method of claim 6, wherein the connection request comprises an identifier of the selected content consumption device.

8. The method of claim 2, further comprising configuring the plurality of light sources to emit light signals having a same identifier encoded therein.

9. A method comprising:
   receiving, by a first computing device and from a second computing device, information comprising an identifier of a light source whose light was detected by the second computing device;
   determining, by the first computing device and based on the identifier of the light source, a location of the light source;
   in response to the determining the location of the light source,
   transmitting, by the first computing device and to the second computing device, a list of one or more content consumption devices at the location of the light source;
   receiving, by the first computing device and from the second computing device, a selection of a selected content consumption device from the list of one or more content consumption devices; and
   in response to the receiving the selection, establishing, by the first computing device, a communication channel between the selected content consumption device and the second computing device.

10. The method of claim 9, wherein the determining the location of the light source further comprises determining that the light source is a display device.

11. The method of claim 9, wherein the transmitting the list of one or more content consumption devices at the location of the light source is based on:
    determining, by the first computing device, a usage history associated with one or more content consumption devices at the location of the light source.

12. The method of claim 9, further comprising:
    receiving, by the first computing device and from a third computing device, an indication that the third computing device has detected light from the light source, and in response, adding, by the first computing device, the third computing device to the list of one or more content consumption devices at the location of the light source.

13. A method comprising:
    detecting, by a computing device at a location, an encoded light signal from a light source at the location, wherein the encoded light signal indicates the location;
    transmitting, by the computing device, a request for a list of controllable devices at the location indicated by the encoded light signal;
    receiving, by the computing device, the list of controllable devices;
    selecting, by the computing device, a controllable device from the list of controllable devices to control based on a determination of a usage history; and
    controlling, by the computing device, the selected controllable device from the list of controllable devices.

14. The method of claim 13, further comprising detecting, by the computing device at the location, the encoded light signal from a plurality of light sources at the location.

15. The method of claim 14, wherein the detecting, by the computing device at the location, the encoded light signal from the plurality of the light sources at the location comprises detecting the encoded light signal from one or more display devices.

16. The method of claim 15, further comprising detecting, by the computing device at the location, the encoded light signal from the plurality of the light sources, wherein the plurality of the light sources comprise at least part of a backlight of the one or more display devices.

17. The method of claim 13, further comprising:
in response to the selecting the controllable device, transmitting, by the computing device to a second computing device remote from the computing device, a connection request to establish a communication channel between the computing device and the selected controllable device.

18. The method of claim 17, wherein the connection request comprises an identifier of the selected controllable device.

19. The method of claim 13, wherein the determination of the usage history further comprises determining, by the computing device, a default controllable device.

20. The method of claim 13, wherein the determination of the usage history is further based on a determination of viewing times of the controllable devices.

* * * * *

UNITED STATES PATENT AND TRADEMARK OFFICE
CERTIFICATE OF CORRECTION

PATENT NO.           : 9,479,250 B2                                        Page 1 of 1
APPLICATION NO.      : 14/291794
DATED                : October 25, 2016
INVENTOR(S)          : Mitchell It is certified that error appears in the above-identified patent and that said Letters Patent is hereby corrected as shown below:

Sheet 3 of 8, FIG. 3:
Please insert the reference numeral --300-- above the drawing in Figure 3

Column 9, Detailed Description, Line 11:
Delete "light interface" and insert --light source interface--

Column 9, Detailed Description, Line 14:
Delete "502." and insert --512.--

Column 9, Detailed Description, Line 14:
Delete "502" and insert --512--

Signed and Sealed this
Thirty-first Day of July, 2018

Andrei Iancu
*Director of the United States Patent and Trademark Office*